Jan. 1, 1929.  
E. WILDHABER  
1,696,930  
METHOD OF CUTTING BEVEL GEARS  
Filed March 1, 1927

INVENTOR  
*Ernest Wildhaber*  
BY  
ATTORNEY

Patented Jan. 1, 1929.

1,696,930

UNITED STATES PATENT OFFICE.

ERNEST WILDHABER, OF BROOKLYN, NEW YORK, ASSIGNOR TO GLEASON WORKS, OF ROCHESTER, NEW YORK, A CORPORATION OF NEW YORK.

METHOD OF CUTTING BEVEL GEARS.

Application filed March 1, 1927. Serial No. 171,774.

The present invention relates to a method of generating bevel gears and particularly to a method of generating straight tooth bevel gears.

The primary object of this invention is to effect a saving in time in the generation of bevel gears. Heretofore, bevel gears have been generated in an operation in which the pitch surface of the blank rolls on the pitch surface of a basic gear represented by the tools. I have found that the amount of movement required to fully generate the tooth profiles of a bevel gear may be materially reduced by rolling the gear as with a surface other than its pitch surface on the pitch surface of the basic gear represented by the tools. Reducing the amount of roll required to fully generate the tooth profiles means, of course, a considerable saving in production time.

In the present invention the blank is rolled as with a cone surface of smaller dimension that its pitch cone surface on the pitch surface of the basic gear represented by the tools and, preferably, the rolling cone surface of the blank is so selected that in the center of the roll the tools contact with the profiles of the tooth surfaces being generated in points midway the height of said profiles.

The accompanying drawings show specifically the application of the present invention to the production of straight tooth bevel gears with reciprocating planing tools. It will be understood, however, that this invention is capable of use in the production of curved tooth bevel gears and with other forms of tools.

Figures 3, 4:
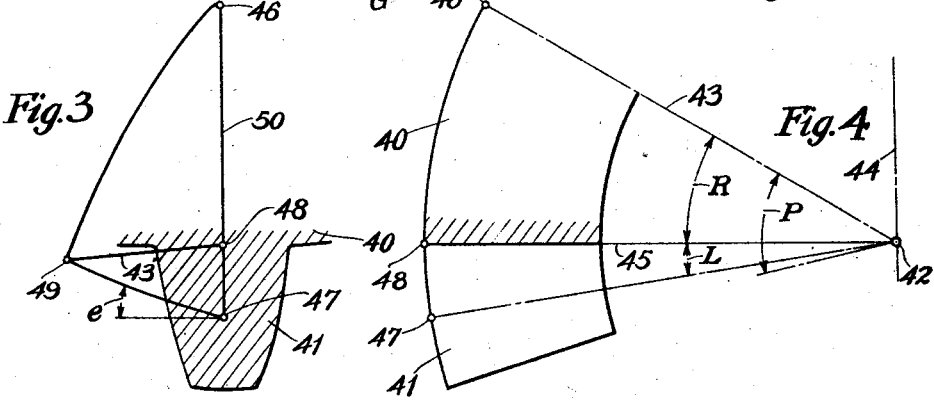
Figure 5:
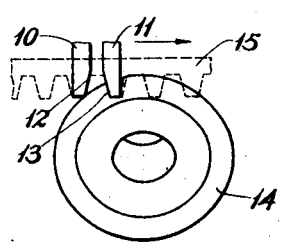
Figure 6:
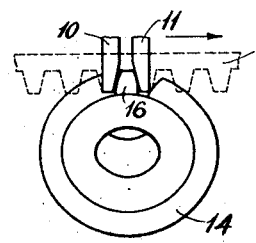
Figure 7:
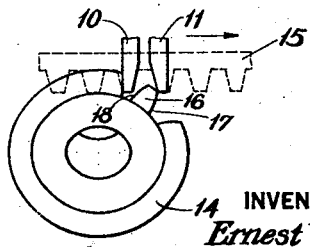

Figures 3 and 4 are a diagrammatic end elevation and side view, respectively, illustrating further the relationship between the blank and basic gear in the generation of bevel gears according to this invention; and Figures 5, 6 and 7 are diagrammatic views showing various relative positions of the planing tools and blank in the generation of opposite side tooth surfaces of involute profile on a bevel gear blank.

In the generation of bevel gears, a cutting motion is imparted to the tool or tools and simultaneously the tool or tools and the blank are moved relatively to each other as though the blank were rolling with a basic gear represented by the tool or tools. In this rolling motion, the cutting edge comes into cutting contact with the tooth surface in a point at the top or bottom of the tooth profile and during the generating roll the point of contact moves along the profile until the tooth surface has been fully generated. This is illustrated diagrammatically in Figures 5 to 7 in which the tools are shown as a pair of planing tools 10 and 11, having finish cutting edges 12 and 13, respectively. During the generating operation, the tools are reciprocated across the face of the blank, indicated at 14, in straight converging paths and simultaneously the tools and blank are moved relatively to each other as though the blank were rolling on a basic gear 15 represented by the tools. The basic gear is usually a crown gear or a nominal crown gear, that is, a gear having a plane top surface and a conical pitch surface.

Figures 5, 6 and 7 show three positions of the tools and blank during the generation of a tooth 16 of the blank. Figure 5 shows a position in the beginning of the roll, where the tool 11 has just started to cut the tooth surface 17 and where the tool 10 has not yet come into engagement with the opposite side tooth surface 18. Figure 6 shows the positions of the tools and blank in the center of the roll and Figure 7 shows the position of tools and blank when the tooth surfaces 17 and 18 have been fully generated and the tool and blank are about to be withdrawn relatively to each other to permit indexing of the blank and return of the tools to their initial position for generation of another tooth of the blank.

Figure 1:
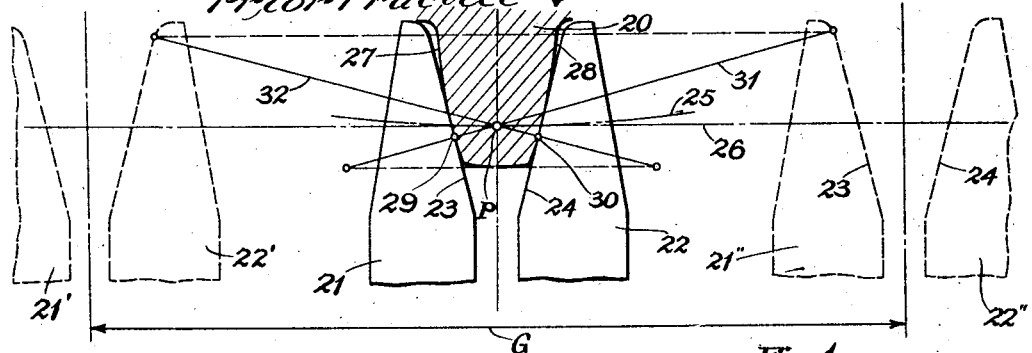
Figure 1 is a diagrammatic view illustrating the present method of generating a straight tooth bevel gear with a pair of reciprocating planing tools.

Figure 1 illustrates the present method of generating bevel gears on a two tool generator. 20 designates a tooth of the blank and 21 and 22 the reciprocating planing tools whose finish cutting edges are designated as 23 and 24, respectively. The tooth 20 shown is of the proportions of a standard tooth of a bevel gear of a 2:1 reduction, such as might be produced upon a Gleason two tool straight tooth bevel gear generator. In this machine, the basic gear, represented by the tools, and upon which the blank rolls during generation is a nominal crown gear, that is, a gear having a plane top surface and a conical pitch surface.

According to the present practise the gear is rolled with its pitch surface 25 on the pitch surface of a basic crown gear represented by the tool. The pitch surface of the nominal crown gear is so nearly a plane that it may be represented by the straight line 26 in Figure 1. In the center of the roll the cutting edges 23 and 24 of the tools 21 and 22 contact with the profiles 27 and 28 of the gear tooth in the points 29 and 30 which lie on the normal lines 31 and 32 passing through the point P which is the instantaneous center of generation. In the present case, the generation of gears with teeth of involute profile, the lines 31 and 32 are also the lines of action between the cutting tools and blank.

It will be noted that the points of contact 29 and 30 are located near the point or tip of the tooth 20. In order to completely generate the side tooth surfaces of the tooth 20 the tools 21 and 22 must travel from the dotted line positions indicated at 21' and 22' where the cutting edge of the tool 22' makes contact with the bottom of the tooth profile 28 to the dotted line positions 21 and 22" where the cutting edge of the tool 21 makes contact with the bottom of the tooth profile 27. This total travel or total cradle roll is equal to the distance G, in Figure 1.

I have found that the amount of roll required to fully generate the tooth surfaces can be very considerably reduced by rolling the blank not on its pitch cone but on another concentric cone which is so selected that in the center of the roll the tools will contact with the tooth profile of the blank in points 35 and 36 which are about in the center of such profile. Here, the rolling cone surface of the blank is the surface 37 which is of smaller dimension than the pitch surface 25. The cone surface 37 rolls on the pitch surface of the basic gear represented by the tools. When the gears are generated in this way, the amount of roll required will be considerably reduced, as is evident from Figure 2. Here, $21_1$ and $22_1$ indicates the extreme left hand positions of the tools 21 and 22 where the tool 22 is making the finishing cut upon the bottom of the tooth profile 28 and $21_2$ and $22_2$ indicate the extreme right hand position of the tools where the tool 21 makes the finishing cut on the bottom of the profile 27.

Figure 2:
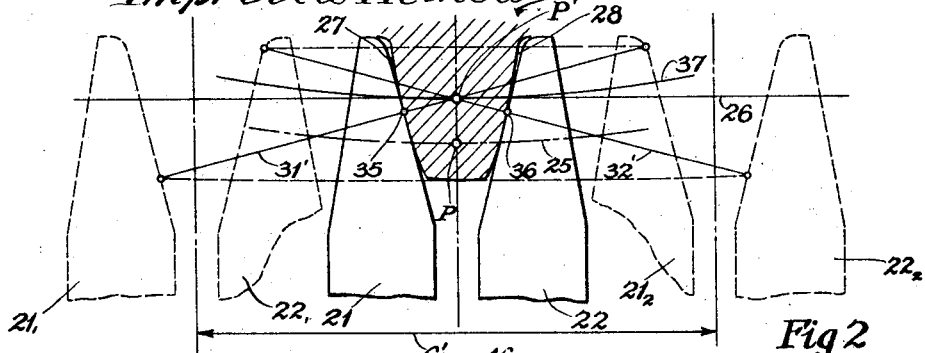
Figure 2 is a similar view showing by way of comparison the method of generating a straight tooth bevel gear with a pair of planing tools according to the principles of this invention.

The amount of roll required with the present invention is reduced from G of Figure 1 to G' of Figure 2. P' is the new instantaneous center of generation. In the present case where the tooth profiles generated are involutes, the points 35 and 36, where the tools contact with the tooth profiles at the center of the roll, will lie approximately midway of the lines of action 31' and 32'. In many cases, with the present invention the amount of roll can be reduced as much as 30% over the amount of roll required with the present practise, which means a very considerable saving in the cutting time.

The dimensions of the cone upon which each member of a pair of bevel gears must be rolled to attain the purposes of this invention and the other dimensions of these gears can be determined as follows: Reference is made particularly to Figures 3 and 4. 40 indicates a portion of the blank to be cut, of which one tooth is shown at 41. 42 is the apex of the blank and 43 its axis. 44 designates the axis of the basic gear with which the blank is to be rolled during generation. R indicates the root angle of the blank and P its pitch cone angle when rolling with a mate gear. In the drawings, the blank is shown as so positioned that its axis makes an angle with a plane passing through the line 45 perpendicular to the axis 44 of the basic gear, equal to its root angle. In other words, the blank is generated conjugate to a nominal crown gear by tools, the top or points of which travel in a plane passing through the line 45 perpendicular to the axis 44 of the crown gear.

P is, as stated, the pitch cone angle of the blank when rolling with a mate gear. The angle R+L is the angle of the cone upon which the blank is rolled during generation. Angle L is itself the complement of the cone angle (90°−L) of the nominal crown gear, upon which the blank is rolled during generation.

Let $a$ equal the pressure angle of the tools used in generating the gear. Inasmuch as the gear rolls with a cone other than its pitch cone, the pressure angle of the gear when generating with the point P' as the instantaneous center will be different from the pressure angle $a$ of the tool. Let $e$ equal the pressure angle when generating the pitch lines. 90° minus $e$ is the angle included between the plane 46—42—47 and the plane of pressure, that is, the plane normal to the tooth surface being cut and including the apex 42 of the blank. In Figure 3, 43' is the projection of the axis of the blank to said plane of pressure. Angle 46—42—49 is what might be called the base cone angle ($b$) in involute gears. Whether the gears are truly involute or not, the same relation will exist between the base cone angles of mate gears as between their pitch angles, namely the proportion of the sines of the base cone angles $\left(\dfrac{\sin b}{\sin b_1}\right)$ equals the ratio of the respective tooth numbers of the mate gear $\left(\dfrac{n}{N}\right)$ where $n$ and $N$ are the tooth numbers of pinion and gear respectively and $b$ and $b_1$ a base cone angle of pinion and gear respectively.

According to spherical trigonometry:

$$\sin b = \sin (R+L) \cos e. \quad (1)$$

Therefore:

$$\frac{\sin (R+L) \cos e}{\sin (R_1+L_1) \cos e_1} = \frac{n}{N}, \quad (2)$$

where $R_1+L_1$, is the cone angle of the cone upon which the mate gear is rolled during generation and $e_1$ is the pressure angle of the tooth of the mate gear when generated in the manner described herein.

Angle $e$ differs slightly from the pressure angle $a$ of the tools. It depends to a certain extent on the angle $\phi$ which is the angle included in the plane passing through line 45

$$\tan e = \frac{\tan a \cos L + \sin \phi \sin L}{\cos \phi} = \frac{\tan a}{\cos \phi} \cos L + \tan \phi \sin L. \quad (5)$$

In figuring a job, the instantaneous center or rolling center $P'$ of the gear to be cut is so assumed that in the center of the roll the points of contact 35 and 36 between the tools and the tooth surfaces to be cut will lie midway the height of the tooth profiles, as shown in Figure 2. The angle L can be determined as follows:

$$L = \frac{(1+C) - \frac{\pi}{4} \tan a}{A(D.P.)}, \quad (6)$$

where C is the clearance ordinarily allowed in bevel gears between the top of the tooth of one gear and the bottom of the tooth space of the mate gear, so as to prevent interference during the roll of the two gears together, A is the cone distance of the gear to be cut and D. P. is the diametral pitch, that is, the ratio of the number of the teeth in the gear to be cut to its pitch diameter.

The angle $\phi$ can be determined from equation 4, above, and the angle $e$ can be determined from equation 5.

The angle $L_1$, referring to the mate gear, is then first approximately determined from the equation 2, $e_1$ being assumed equal to $a$. Angle $L_1$ so determined is then used in equation 4 to determine the angle $\phi_1$ for the mate gear, and with this angle, the angle $e_1$ can be determined from equation 5. The angle $e_1$ resulting from equation 5 is then used in equation 2 for more accurately determining angle $L_1$. In the way described, the cone angles of the cones upon which each member of the pair of mate gears is to be rolled during generation, can be determined.

When gears are cut according to this invention with tools of standard pressure angles, the pressure angles of the gears will be found to be slightly larger than of the tools. The increase in pressure angle on the gears perpendicular to the crown gear axis 44, by the edge of the crown gear tooth with a line drawn centrally through the gear tooth being generated, that is, the line 50 of Figure 3. In other words, the angle $\phi$ is a measure of the phase of the generating roll.

The angle $\phi$ can be determined approximately with sufficient accuracy by assuming that the actual pressure angle is equal to $a$. The angle $\phi$ then equals:

$$\phi = \frac{(d-L)}{\sin a \cos a} + L \tan a \quad (3)$$

and:

$$\phi = \frac{d - L \cos^2 a}{\sin a \cos a}. \quad (4)$$

Angle $e$ can then be determined as follows:

over the tool pressure angles diminishes, however, with increasing numbers of teeth in the gears and with increasing ratios, as is desirable. By using tools of special pressure angles, a further saving in time can be effected over that in which tools of standard pressure angle are employed.

While the present invention has been described particularly with reference to the generation of straight tooth bevel gears it will be evident that it can be applied also to the production of curved tooth bevel gears, either by the use of planing tools which move in curved paths across the face of the blank during the cut, or by the use of tools of the rotary annular face mill type, where the cutting blades are annularly arranged and the tool rotates on its axis during the cutting operation. The principles of this invention are applicable, moreover, not only to the production of bevel gears with planing and milling tools but also with grinding tools and the tools need not be of straight profile but may have any desired curvature.

In general, while I have described my invention with reference to a particular embodiment, it will be understood that it is not intended to limit the invention to the embodiment described, but that this application is intended to cover any variations, uses, or adaptations of my invention, following, in general, the principles of the invention and including such departures from the present disclosure as come within known or customary practise in the gear art and may be applied to the essential features hereinbefore set forth and as fall within the scope of the invention and the limits of the appended claims.

Having thus described my invention, what I claim is:

1. The method of producing a bevel gear which consists in cutting its side tooth surfaces two sides simultaneously by moving a pair of cutting edges across the face of a tapered gear blank while imparting a relative rolling motion between the cutting edges and blank in which the blank rolls with a cone surface of smaller dimension than its pitch cone surface on the pitch surface of a basic gear represented by said cutting edges, thereby to reduce the amount of roll required to generate the tooth profiles.

2. The method of producing a bevel gear which consists in cutting its side tooth surfaces two sides simultaneously by moving a pair of cutting edges across the face of a tapered gear blank while imparting a relative rolling motion between the cutting edges and blank in which the blank rolls with a cone surface of smaller dimension than its pitch cone surface on the pitch surface of a basic gear, represented by the cutting edges, having a plane top surface and a conical pitch surface, thereby to reduce the amount of roll required to generate the tooth profiles.

3. The method of producing a bevel gear which consists in reciprocating a pair of cutting edges adapted to finish cut opposite side tooth faces of the blank, in straight converging paths across the face of a tapered gear blank while imparting a relative rolling motion between the cutting edges and blank in which the blank rolls with a cone surface of smaller dimension than its pitch cone surface on the pitch surface of a basic gear represented by said cutting edges, thereby to reduce the amount of roll required to generate the tooth profiles.

4. The method of producing a bevel gear which consists in reciprocating a pair of cutting edges adapted to finish cut opposite side tooth faces of the blank, in straight converging paths across the face of a tapered gear blank while imparting a relative rolling motion between the cutting edges and blank in which the blank rolls with a cone surface of smaller dimension than its pitch cone surface on the pitch surface of a basic gear, represented by the cutting edges, having a plane top surface and a conical pitch surface, thereby to reduce the amount of roll required to generate the tooth profiles.

5. The method of producing a bevel gear which consists in cutting its side tooth surfaces two sides simultaneously by moving a pair of cutting edges across the face of a tapered gear blank while imparting a relative rolling motion between the cutting edges and blank in which the blank rolls with a cone other than its pitch cone on the pitch surface of a basic gear represented by the cutting edges, said rolling cone surface of the blank being so selected that in the center of the roll, the cutting edges contact with opposite side tooth profiles of the blank in points approximately midway the height of said profiles.

6. The method of producing a bevel gear which consists in cutting its side tooth surfaces two sides simultaneously by moving a pair of cutting edges across the face of a tapered gear blank while imparting a relative rolling movement between the cutting edges and blank, in which the blank rolls with a cone other than its pitch cone on the pitch surface of a basic gear, represented by the cutting edges, having a plane top surface and a conical pitch surface, said rolling cone surface of the blank being so selected that in the center of the roll, the cutting edges contact with opposite side tooth profiles of the blank in points approximately midway the height of said profiles.

7. The method of producing a bevel gear which consists in reciprocating a pair of planing tools adapted to finish cut opposite side tooth faces of a blank, in straight converging paths across the face of a tapered gear blank while imparting a relative rolling motion between the tools and blank in which the blank rolls with a cone other than its pitch cone on the pitch surface of a basic gear represented by the tools, said rolling cone surface of the blank being so selected that in the center of the roll, the tools contact with opposite side tooth profiles of the blank in points approximately midway the height of said profiles.

8. The method of producing a bevel gear which consists in reciprocating a pair of planing tools, adapted to finish cut opposite side tooth faces of the blank, in straight converging paths across the face of a tapered gear blank while imparting a relative rolling movement between the tools and blank in which the blank rolls with a cone other than its pitch cone on the pitch surface of a basic gear, represented by the tools, having a plane top surface and a conical pitch surface, the rolling cone surface of the blank being so selected that in the center of the roll the tools contact with opposite side tooth profiles of the blank in points approximately midway the height of said profiles.

9. The method of generating a bevel gear which consists in positioning a pair of cutting edges and a tapered gear blank relatively to each other so that in the center of the roll the points of contact between the cutting edges and the tooth profiles being generated lie approximately midway of the lines of action, and in imparting a cutting motion to the cutting edges while rolling the blank as with a cone other than its pitch cone on the pitch surface of the basic gear represented by the tools.

10. The method of generating a bevel gear with teeth of involute profile which consists in positioning a pair of cutting edges and a tapered gear blank relatively to each other so that in the center of the roll the points of contact between the cutting edges and the tooth profiles being generated lie approximately midway of the lines of action and imparting a cutting movement to the cutting edges while simultaneously producing a relative rolling motion between the tools and blank in which the blank rolls as with a cone other than its pitch cone on the pitch surface of a basic gear, represented by the tools, having a plane top surface and a conical pitch surface.

11. The method of generating a bevel gear with teeth of involute profile which consists in positioning a pair of planing tools and a tapered gear blank relatively to each other so that in the center of the roll the points of contact between the cutting edges of the tools and the tooth profiles being generated lie approximately midway of the lines of action, and in reciprocating the tools in straight converging paths across the face of the blank while producing a relative rolling motion between the tools and blank in which the blank rolls with a cone other than its pitch cone on the pitch surface of a basic gear, represented by the tools, having a plane top surface and a conical pitch surface.

12. The method of generating a bevel gear with teeth of involute profile which consists in positioning a pair of planing tools and a tapered gear blank relatively to each other so that in the center of the roll the points of contact between the cutting edges of the tools and the tooth profiles being generated lie approximately midway of the lines of action, and in reciprocating the tools in straight converging paths across the face of the blank while producing a relative rolling motion between the tools and blank in which the blank rolls with a cone other than its pitch cone on the pitch surface of a basic gear, represented by the tools.

13. The method of generating a bevel gear with teeth of involute profile which consists in positioning a pair of planing tools and a tapered gear blank relatively to each other so that in the center of the roll the points of contact between the cutting edges of the tools and the tooth profiles being generated lie approximately midway of the lines of action, and in reciprocating the tools across the face of the blank while producing a relative rolling motion between the tools and blank in which the blank rolls with a cone other than its pitch cone on the pitch surface of a basic gear, represented by the tools.

ERNEST WILDHABER.